(12) United States Patent
Guillaume

(10) Patent No.: US 8,413,467 B2
(45) Date of Patent: Apr. 9, 2013

(54) DEVICE AND METHOD FOR CAMBERING A GLASS SHEET

(75) Inventor: Jean-Francois Guillaume, Jumet (BE)

(73) Assignee: AGC Flat Glass Europe SA, Watermael-Boitsfort (BE)

( * ) Notice: Subject to any disclaimer, the term of this patent is extended or adjusted under 35 U.S.C. 154(b) by 0 days.

(21) Appl. No.: 11/568,296

(22) PCT Filed: Apr. 19, 2005

(86) PCT No.: PCT/EP2005/051711
§ 371 (c)(1),
(2), (4) Date: Jun. 14, 2007

(87) PCT Pub. No.: WO2005/102945
PCT Pub. Date: Nov. 3, 2005

(65) Prior Publication Data
US 2007/0283720 A1    Dec. 13, 2007

(30) Foreign Application Priority Data
Apr. 26, 2004   (EP) ..................................... 04101735

(51) Int. Cl.
*C03B 23/035*    (2006.01)
(52) U.S. Cl.
USPC ................ 65/287; 65/106; 65/286; 65/291
(58) Field of Classification Search ............ 65/27, 171, 65/172, 173, 355, 356, 361, 106, 273, 29.1, 65/29.11, 122, 124, 287, 288, 319, 286, 291
See application file for complete search history.

(56) References Cited

U.S. PATENT DOCUMENTS

| | | | |
|---|---|---|---|
| 3,361,552 A | 1/1968 | Ritter, Jr. | |
| 4,526,605 A | 7/1985 | Frank et al. | |
| 4,711,654 A * | 12/1987 | Iida | ................. 65/172 |
| 4,859,225 A | 8/1989 | Kuster et al. | |
| 5,286,271 A * | 2/1994 | Rueter et al. | .................... 65/106 |
| 5,346,526 A | 9/1994 | Flaugher et al. | |
| 5,599,367 A | 2/1997 | Funk et al. | |
| 6,044,662 A * | 4/2000 | Morin | ............................. 65/107 |
| 2002/0116951 A1 * | 8/2002 | Dunifon et al. | ................. 65/106 |

FOREIGN PATENT DOCUMENTS

| | | |
|---|---|---|
| EP | 0613864 A | 9/1994 |
| JP | 2000143261 | 5/2000 |

OTHER PUBLICATIONS

Definition of Contiguous [online], [retrieved on May 11, 2010], retrieved Dictionary.com (http://dictionary.reference.com/browse/contiguous).*

* cited by examiner

*Primary Examiner* — Matthew Daniels
*Assistant Examiner* — Yana Belyaev
(74) *Attorney, Agent, or Firm* — Oblon, Spivak, McClelland, Maier & Neustadt, L.L.P.

(57) ABSTRACT

The invention relates to a device for cambering a glass sheet, said device comprising a pressing station provided with a male press and a female press which are arranged opposite each other in a complementary manner. The male press is formed from at least two distinct resilient parts, a base and at least one forming complement, which are adapted in such a way as to be fixed to each other. Said forming complement is detachable and interchangeable according to the form to be applied to the glass sheet, and comprises a fixing surface which is adapted in such a way as to be fixed to a fixing surface of the base, and a forming surface which is adapted in such a way as to be pressed against the glass sheet in order to apply the desired form thereto. The invention also relates to an industrial installation comprising one such device, and to a method for implementing said device.

22 Claims, 2 Drawing Sheets

DEVICE AND METHOD FOR CAMBERING A GLASS SHEET

CROSS-REFERENCE TO RELATED APPLICATIONS

This application is the national stage entry of International Application No. PCT/EP2005/051711, filed 19 Apr. 2005, which claims priority to European Application No. 04101735.1 filed 26 Apr. 2004, the disclosures of all of which are hereby incorporated by reference.

BACKGROUND

The present invention relates to a device and method for bending a glass sheet.

Bent glass sheets can have various applications. They can be used in particular as glazing units in vehicles, e.g. automobiles, as windscreens, side windows, rear windows or roofs. These glazing units can be toughened or laminated. For such applications it is necessary that the bending device allows the glass sheets to be shaped in a precise manner without causing any optical flaws.

A technique is known in particular, wherein a glass sheet is transported on a roller conveyor through a tunnel oven, in which its temperature is brought to its softening temperature, then is passed to a bending station comprising a pressing operation, therefore also sometimes referred to as a pressing station. In the bending station the glass sheet is lifted from the conveyor by means of a frame with a shape corresponding to that which the periphery of the glass sheet is to be given.

The frame can either be discontinuous to be able to pass through the bed of rollers on which the glass sheet initially rests, or is preferably continuous, in which case the conveyor can be made up of roller wheels at this location. The frame then lifts the glass sheet in order to place it against the surface of an upper mould (also referred to as counter-mould or male press). The mould is complementary to the frame and therefore corresponds to the desired shape of the glass sheet.

Other variants comprise the same type of pressing operation. For example, the glass sheet can be placed on a frame before entering the tunnel and advance in this while being supported by the frame. The pressing on the upper mould is conducted by the same frame or a frame replacing this for lifting and pressing the sheet.

In some variants, the glass sheet can be applied against the upper mould by suction through this mould. This is achieved, for example, by means of a plurality of ducts connected to means that ensure a certain low pressure on the surface of the mould. These ducts connect, for example, with a central chamber under reduced pressure. Such an arrangement allows the glass sheet to be subjected to suction and therefore cooperates with the movement of the frame in shaping the glass sheet.

After pressing, the frame moves down again to the conveyor level. Following these techniques, either the frame retracts below the bed of rollers and thus places the glass sheet back onto said bed of rollers, or the frame resumes its path carrying the sheet.

In a variant, the lower frame moves down again while the glass sheet is still held against the upper press by the suction force thereof, a second "shuttle" frame is positioned below the glass sheet and suction is stopped so that the glass sheet is positioned on the shuttle. The periphery of this shuttle frame corresponds to the profile of the final bent sheet.

In all cases, the bent glass sheet is directed to the cooling or toughening station.

The type of bending technique described above is characterised by the fact that the pressing operation is conducted outside the oven or at least outside a temperature-controlled zone. This type of technique must therefore be considered as a cold method, this definition indicating the location of the pressing station outside a temperature-regulated chamber. It is also known to position a heating system in the upper press in order to compensate the temperature loss resulting from the bending being performed outside the oven. This heating system can be heating resistors, for example.

In another bending technique, the pressing operation is conducted in the oven. The presses can be heated by the oven in this case.

For each design of bent glass two complementary pressing elements have to be made: the solid upper mould, also referred to as the male press, and the lower frame, also referred to as ring or female press.

The male press is configured from a block that must be highly precise in shape. Moreover, in current practice, this press includes all the functional elements such as the means for ensuring suction of the sheet or the elements for heating the press when it is necessary to reheat the press to prevent the glass sheet from being subjected to a thermal shock. Therefore, in practice, the machining of this part is relatively complex, long and costly.

When the design of bent glass being produced on the bending assembly has to be changed for another design, the male press and female press must also be changed. Production is stopped to allow time to position the pressing element correctly opposite one another and time to reach the proper temperature of the presses. This time can be relatively long, particularly in the case of the male press, which is characterised by a certain thermal inertia mainly due to its mass.

SUMMARY

According to one of its aspects, the present invention relates to a device for bending a glass sheet such as claimed in Claim 1. The other claims define alternative and/or preferred aspects of the invention.

The invention can enable the cost and time associated with the production of the male pressing element to be limited and can also enable the changing of this element to be simpler and quicker, when the design of bent glass being produced on the assembly line changes. It can also provide the advantage that the largest portion of the male press remains in place and at the proper temperature, and that only one part of the male press has to be handled and brought to the suitable temperature. These are clear advantages, since an increasing number of automobile glazing units are bent and there are an increasing number of different designs of bent glazing units.

According to an embodiment of the invention, one of the pressing elements forming the bending/pressing station, preferably the male press, is formed by at least two separate resilient parts, which are adapted to be fastened to one another. These two parts are called the base and complementary shaping surface or complement. The base and the complement can be made either by both being made of cast iron or refractory steel, i.e. a steel resistant to high temperatures, or by one being made of steel and the other of cast iron. Preferably, both are made of the same material. They constitute rigid parts. The complement, which is detachable and interchangeable in keeping with the shape that the glass sheet is to be given, comprises a fastening surface adapted to be fastened to a fastening surface of the base and a shaping surface adapted to be pressed against the glass sheet and to give it the desired shape. The given shape of the glass sheet at this stage of the bending process is not necessarily the definitive final shape of the glass sheet. It may be that the glass sheet relaxes a little after pressing. The complement is a resilient part that can be fastened to the base, for example, by screws.

Preferably, the complement is fastened to the base to be as contiguous as possible so that the heat of the base can communicate with the complement by simple conduction. In some embodiments of the invention, the fastening surfaces of the base and the complement can be surfaces that are not plane and/or discontinuous. In fact, discontinuities in the form of apertures or grooves, for example, can be present on the fastening surfaces of the base and/or complement. The shaping surface of the complement, i.e. the surface that gives the glass sheet a particular shape, is not plane and can also be discontinuous.

In some embodiments of the invention, a flexible metal fabric can cover the shaping surface of the male press. This can allow marks in the glass to be prevented or reduced during pressing.

Preferably, the male press comprises means that enable a reduced pressure to be generated on the shaping surface of the complement. These means can enable the glass sheet to be pulled onto the male press or at least assist the movement of the glass sheet towards the male press. They can also allow the glass sheet to rest against the male press while the female press moves away and gives way, for example, to a shuttle frame. The reduced pressure can then be cut and the glass sheet can be deposited in the shuttle. In a particular embodiment of the invention, the base comprises a chamber in its centre that is connected to suction means. This can be a vacuum pump in order to create a reduced pressure in the chamber, i.e. a pressure lower than atmospheric pressure. Duct can connect with the chamber and these can also operate at reduced pressure and open onto the shaping surface. Apertures can then be visible on the shaping surface. When the male press is formed from a base and a complementary shaping surface, it is important that these means for allowing a reduced pressure to be generated are continuous across these two parts. Preferably, the apertures of the ducts present on the fastening surface of the complement are congruent with apertures present on the fastening surface of the base.

In some embodiments of the invention, the complement does not entirely cover the base, i.e. the fastening surface of the complement is smaller than the fastening surface of the base. In this case, it is possible to fasten elements to the base in order to plug the apertures in the base that are not covered by the complement. Preferably, these elements are high temperature-resistant stainless steel plates or sheets. Alternatively, the complement itself can include sections that do not constitute a shaping surface but allow the suction apertures to be plugged.

Preferably, to assure a good seal between the base and the complement, it is possible to create one or more grooves on the fastening surface either of the base or of the complement or of both, and to fill them with a high temperature-resistant sealing strip that will ensure tightness by compressing when the fastening screws are tightened.

The invention can be applied either in the case where the pressing station is located in the oven or in a temperature-regulated chamber, or in the case where the pressing station is located outside the oven or outside a temperature-controlled zone. In this latter case, the base of the male press preferably comprises heating elements. These can be formed, for example, by electrical heating resistors incorporated in the solid mass of the base.

In some embodiments of the invention, the male press can include more than one complementary shaping surface, which are either identical or different. The male press can be formed, for example, from a base and two complementary shaping surfaces. The complements are both adapted to be fastened to the base, are detachable and interchangeable in keeping with the shapes that the glass sheets are to be given, each comprise a fastening surface adapted to be fastened to the fastening surface of the base and each comprise a shaping surface adapted to be pressed against the glass sheets and provide them with a desired shape. The female press can then itself comprise more than one frame, e.g. two frames, each complementary to one of the two complementary shaping surfaces of the male press. This can advantageously increase production on the assembly line by allowing two glass sheets, or even more, to be pressed in a single operation.

The invention also relates to an industrial installation for bending glass sheets comprising a tunnel oven, a pressing station, which can be located in the oven or outside it, various pairs of complementary male and female presses in keeping with the various designs of curvature of glass sheets, and a cooling or toughening station, characterised in that at least one of the male presses, which can be used in the pressing station, is formed by at least two separate resilient parts, a base and at least one complementary shaping surface, which are adapted to be fastened to one another, and characterised in that the complement, which is detachable and interchangeable in keeping with the shape the glass sheet is to be given, comprises a fastening surface adapted to be fastened to a fastening surface of the base and a shaping surface adapted to be pressed against the glass sheets and provide them with the desired shape. The installation thus comprises all the male and female presses, which can be stored in the surroundings of the pressing station and can be used alternatively in the pressing station proper in the manner of replacement parts. The installation can use traditional male presses in a single piece as well as male presses according to the invention that are formed by at least two resilient parts.

The invention also relates to a method for bending a glass sheet comprising a pressing step between two presses opposite and complementary to one another according to the invention. The pressing step can be achieved either inside or outside the oven or outside a temperature-regulated chamber. One of the advantages of the pressing step outside the oven is improved accessibility to the works equipment and therefore a much greater facility to change and regulate it. When the curved glass design being produced on the assembly line changes for another design, all that is required to change the male press is to detach the complementary shaping surface of the base while this remains in place and to attach another complement to it that corresponds to the new desired glass design.

Advantageously, when pressing is conducted outside the oven, the male press includes heating elements. It is not necessary for the pressing complement according to the invention to itself comprise such heating elements. This can facilitate its production and reduce its cost. The complement can be heated by conduction on contact with the base that includes the heating elements. The complement can be designed to be as compact as possible and therefore be heated more quickly. It is preferably made of cast iron or high-temperature steel, which allows the heat to be conducted from the base to the complement. It is also possible to preheat the complementary shaping surface before placing it on the base in the pressing station.

BRIEF DESCRIPTION OF THE DRAWINGS

Various aspects of the invention shall now be described solely by way of examples with reference to the drawings. These examples are not restrictive. The figures are not drawn to scale.

DETAILED DESCRIPTION

Example 1

Figure 1:
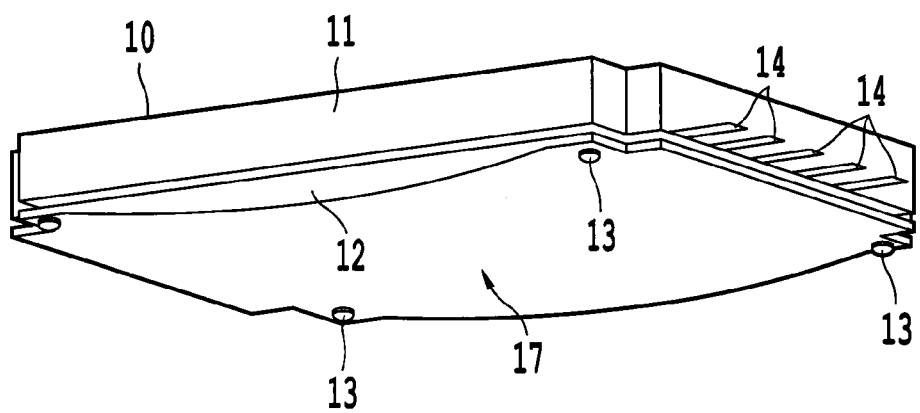
FIG. 1: is a perspective view of a male press according to the invention comprising heating elements.
Figure 2:
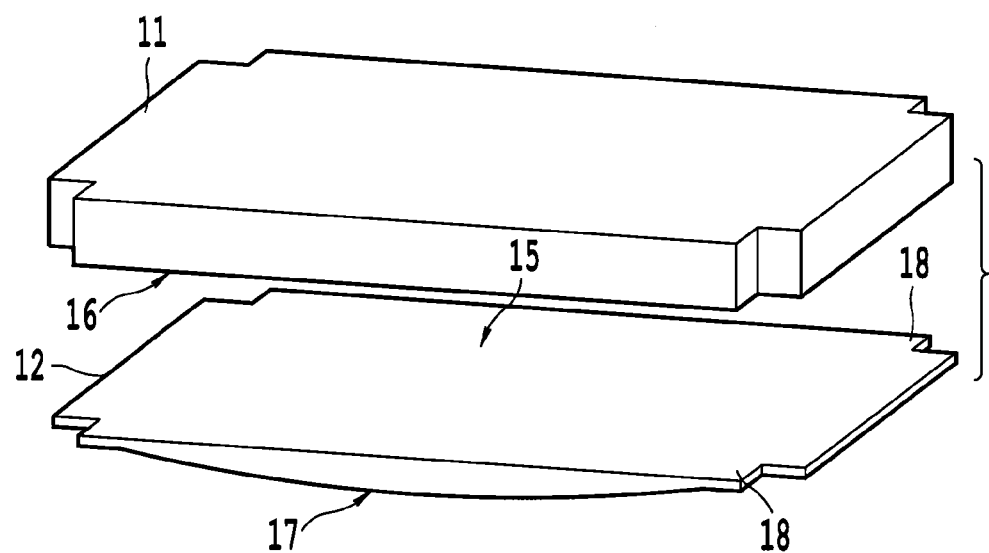
FIG. 2: is a perspective exploded view of a male press according to the invention comprising heating elements.

A bent glazing is produced on a production line via the following steps. A glass sheet is transported on a roller conveyor and passes into a tunnel oven, where it is brought up to its softening temperature, e.g. about 650-660° C. A pressing station is located at the exit of the tunnel oven. The glass sheet, still on the rollers, is directed into the pressing station, where it is lifted from the conveyor by a frame with a shape corresponding to that which the periphery of the glass sheet is to be given. The frame is continuous and passes through the bed of rollers, on which the glass sheet initially lies. This frame, also referred to as female press, is adapted to be pressed against the periphery of the glass sheet and provide it with a desired shape. The frame then lifts the glass sheet to press it against an upper male press with a shape complementary to the frame and therefore corresponding to the desired shape for the glass sheet. After pressing, the lower frame moves down again to a level below the bed of rollers and thus places the now bent glass sheet back on the bed of rollers. These rollers are then set in motion again and transport the glass sheet to a cooling station. At the end of the assembly line after cooling, the glass sheet has the desired final curvature, which is not generally equivalent to the curvature given by the pressing step. The shape of the curvature given by pressing between the male and female presses is in fact an intermediate curvature, which must be calculated with precision so that the desired final curvature is achieved after the glass has relaxed slightly and cooled. The male press 10 is shown in FIG. 1. It consists of two separate resilient parts made of cast iron: a base 11 and a complementary shaping surface 12. The complementary shaping surface or complement is fastened to the base by screws 13. The base comprises heating elements composed of electrical resistors 14, which pass through it and allow a temperature of about 300-400° C. to be reached on the base. This temperature can be regulated by means of thermocouples 14 located in the base. The complement is adapted to the base and is contiguous to it so that the base can heat the complement by thermal conduction, and therefore the temperature of the complement is similar to that of the base. It is necessary for the press to be at a sufficient temperature in order to prevent cold points arising in the glass, which could constitute brittle points. As may be seen in FIG. 2, the complementary shaping surface 12 can be detached from the base 11 to be interposed with another complement when the curvature design being produced on the assembly line is changed. The complementary shaping surface 12 comprises a fastening surface 15 adapted to be fastened to the fastening surface of the base 16 and a shaping surface 17 adapted to be pressed against the glass sheet to provide it with a desired shape. The seatings 18 provided for the fastening screws are visible in the complement.

Example 2

Figure 3:
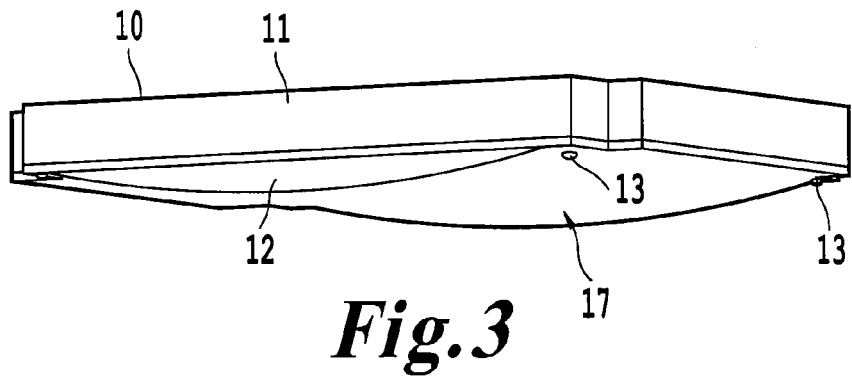
FIG. 3: is a perspective view of a male press according to the invention without heating elements.

A bent glazing is produced on a production line as described in Example 1 except that the pressing station is located in the tunnel oven, i.e. in an environment with a temperature of about 700° C. The male press does not have internal heating elements in this case. This is the male press shown in FIG. 3.

Example 3

Figure 4:
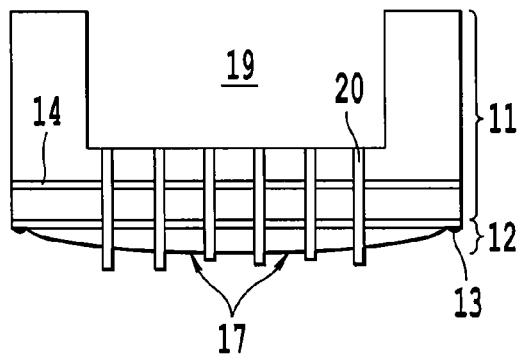
FIG. 4: is a schematic sectional view of a male press according to the invention comprising a suction system and heating elements.

A bent glazing is produced on a production line as described in Example 1 except that the movement of the glass during the pressing step is achieved in a slightly different manner. In this example, shown in FIG. 4, the male press 10 comprises means that allow creation of a reduced pressure on the shaping surface 17 of the complement. These means consist of a chamber 19 connected to a system (not shown) for creating the vacuum or at least a pressure lower than atmospheric pressure, and of ducts 20 that pass through the male press to the shaping surface 17. This system allows the glass sheet to be pulled towards and/or held against the shaping surface by means of suction. When the glass sheet arrives in the pressing station, the reduced pressure system is activated and the glass sheet is subjected to suction by the male press at the same time as the female press frame lifts the glass sheet. After pressing, the frame moves down again while the glass sheet is still held against the upper press by the suction force thereof. A shuttle frame is positioned below the glass sheet and suction is stopped so that the glass sheet is positioned on the shuttle. It is the shuttle frame that transports the bent glass to the cooling station.

Example 4

Figure 5:
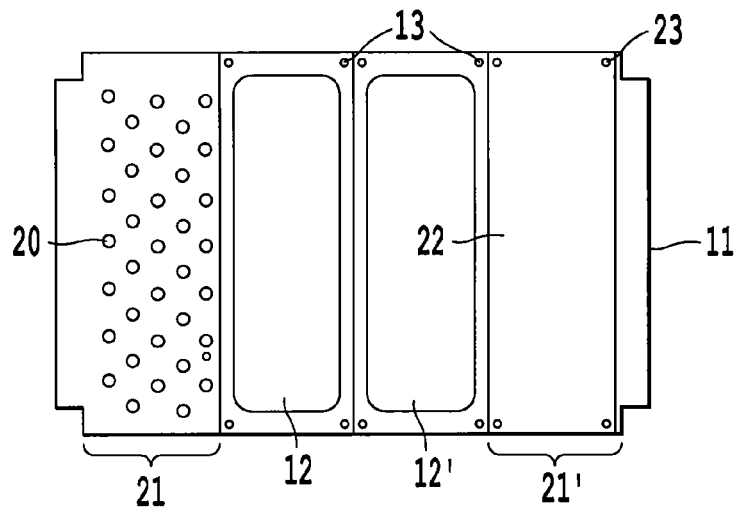
FIG. 5: is a schematic view from below of a male press according to the invention comprising a suction system and two complementary shaping surfaces.

Bent glazing units are produced on a production line as described in Example 3 except that two glazing units are produced simultaneously as a result of two complementary shaping surfaces being fastened to the base. FIG. 5 shows a view of the male press from below. Two complementary shaping surfaces 12 and 12' are fastened to the base 11 by screws 13. The base has a dimension of 125×86 cm. The apertures where the ducts 20 of the suction system exit may be seen in zones 21 and 21' of the fastening surface of the base where there is no complementary shaping surface. During operation, these apertures are plugged by a high temperature-resistant stainless steel plate 22 fastened by means of screw 23 being placed on the fastening surface of the base. In this example, two glass sheets are conveyed in parallel on the bed of rollers and are lifted and pressed against the male press by two female frames.

The invention claimed is:

1. A bending device for bending a glass sheet, comprising:
   a pressing station comprising a male press and a female press arranged opposite each other to be complementary to one another,
   wherein the male press comprises a mold having a base and at least one complementary shaping surface, wherein the base and the complementary shaping surface are adapted to be fastened to one another,
   wherein the complementary shaping surface has a glass shaping surface adapted to be pressed against the glass sheet and provide the glass sheet with the desired shape, and a fastening surface opposite the glass shaping surface, wherein the fastening surface of the complementary shaping surface is directly adjacent and contiguous with a mounting surface of the base, and wherein the complementary shaping surface is detachable from the base and the base is larger than the complementary shaping surface.

2. The bending device according to claim 1, wherein the male press comprises means that enable a reduced pressure to be generated on the shaping surface of the complement in order to pull and/or hold the glass sheet against the shaping surface, said means included both in the base and in the complement.

3. The bending device according to claim 1, wherein the base comprises a chamber and ducts connecting with the chamber, wherein the chamber and the ducts are all connected to a suction means.

4. The bending device according to claim 3, wherein the complementary shaping surface comprises one or more ducts connecting with one or more ducts in the base at the level of the fastening surface and opening onto the shaping surface.

5. The bending device according to claim 1, wherein the base includes one or more heating elements.

6. The bending device according to claim 1, wherein the female press is a frame adapted to be pressed against a peripheral section of the glass sheet and provide the glass sheet with a desired shape.

7. The bending device according to claim 1, wherein the base portion is larger than the complementary shaping surface, wherein the male press comprises a plurality of identical or different complementary shaping surfaces.

8. The bending device according to claim 7, wherein the female press comprises several frames, each being complementary to one of the complementary shaping surfaces of the male press.

9. The bending device of claim 1, wherein the base portion is larger than the complementary shaping surface.

10. The bending device of claim 1, wherein the base portion and the complementary shaping surface are cast iron.

11. The bending device of claim 1, wherein the fastening surface of the complementary shaping surface and the mounting surface of the base are planar and the fastening surface is in continuous contact with the mounting surface.

12. The bending device of claim 1, wherein the base is made of cast iron and the complementary shaping surface is made of steel.

13. The bending device of claim 1, wherein the male press further comprises a frame to which the mold is attached.

14. The bending device of claim 1, wherein the male mold comprises one or more heating elements present only in the base.

15. The bending device of claim 1, wherein there are no heating elements in the base and the complementary shaping surface.

16. A system for bending glass sheets, comprising:
a tunnel oven, a pressing station, one or more pairs of complementary male and female presses, and a cooling or toughening station,
wherein at least one of the male presses comprises at least two separate resilient parts, a base and at least one complementary shaping surface, wherein the base and the complementary shaping surface are adapted to be fastened to one another, wherein the complementary shaping surface is contiguous with and detachable from the base and comprises a fastening surface adapted to be fastened to a fastening surface of the base and a shaping surface adapted to be pressed against the glass sheets and provide the glass sheets with a desired shape.

17. The system of claim 16, wherein the base portion is larger than the complementary shaping surface.

18. The system of claim 16, wherein the base portion and the complementary shaping surface are cast iron.

19. A method for bending a glass sheet, comprising:
pressing a sheet of glass between the complementary shaping surface of the male press and the female press of the bending device according to claim 1.

20. The method of bending according to claim 19, wherein the pressing is conducted outside the oven.

21. The method of bending according to claim 19, wherein the complementary shaping surface is heated by conduction on contact with the base and the base comprises one or more heating elements.

22. A method for bending a glass sheet, comprising:
pressing a sheet of glass between the two presses opposite and complementary to one another in the system according to claim 16.

* * * * *